(No Model.)

R. EICKEMEYER.
HAT STRETCHING MACHINE.

No. 256,305. Patented Apr. 11, 1882.

FIG. 2.

ATTEST:

INVENTOR:
Rudolf Eickemeyer

UNITED STATES PATENT OFFICE.

RUDOLF EICKEMEYER, OF YONKERS, NEW YORK.

HAT-STRETCHING MACHINE.

SPECIFICATION forming part of Letters Patent No. 256,305, dated April 11, 1882.

Application filed January 30, 1882. (No model.)

*To all whom it may concern:*

Be it known that I, RUDOLF EICKEMEYER, of Yonkers, in the county of Westchester and State of New York, have invented certain new and useful Improvements in Hat-Stretching Machines; and I do hereby declare that the following specification, taken in connection with the drawings furnished and forming a part thereof, is a clear, true, and complete description of my invention and of a machine embodying the several features thereof.

The principal object of my present invention is to provide for automatically stretching hat-brims rapidly and effectually by persons of ordinary skill, and with a minimum of liability of injury to hat-bodies during the stretching operation. The automatic operation referred to involves in the stretching-machine the bringing of the upper and lower co-operative stretching devices into working relations with each other, their separation, and the stoppage of such a portion thereof as will prevent further action of the stretching devices on the same hat-body in the absence of immediate care by the attendant, and enable the stretched hat-body to be removed and another substituted. These features are also involved in an automatic tip-stretching machine heretofore devised by me, which constitutes the subject of an application for Letters Patent heretofore filed by me, and although hereinafter described and shown in the drawings annexed, they do not, when broadly considered constitute portions of my present invention, the same having been made the subject of claims in said prior application. The automatic stretching of brims also involves a rotation of the hat-body during the stretching operation, and although in my tip-stretching machine referred to a similar movement is provided for, the means relied upon therein cannot be employed in brim-stretching, because the brim of a hat-body must be fully exposed to the action of the stretching devices, whereas in stretching tips the brim may be clamped and the hat-body rotated on its former by rotating the clamping mechanism. In my present machine I employ a series of rapidly reciprocating or vibrating brim-stretching fingers of the character shown and described in my prior Letters Patent No. 175,953, dated April 11, 1876; but I have now devised certain novel features in connection therewith of special value in an automatic machine. I also employ in connection with said fingers a shell, on which a hat-body is supported, and around its base are devices which co-operate for stretching with the reciprocating or vibrating brim-stretching fingers, the whole constituting, when broadly considered, a former, substantially as shown and described in said prior Letters Patent; but it nevertheless contains many novel features which have special value in connection with automatic brim-stretching machines.

After a full description of a machine embodying all of my present improvements the features deemed novel will be specified in detail in the several claims hereunto annexed.

Referring to the drawings, of which there are five sheets, Figure 1, Sheet 1, is a side elevation of one of my machines with some of the stretching devices detached, but with such of the latter as are shown in their working positions. Fig. 4, Sheet 4, is a view of the lower portion of the machine, partially in plan and partially in section, near the line $x$, Fig. 3. Figs. 5 and 6, Sheet 4, are detailed views of the clutch mechanism which constitutes a part of the stop-motion.

The frame of the machine may be variably constructed; but, as shown, it embodies two side plates, A, united by a horizontal lower plate, A', middle plate, A², and top plate, A³, and suitable bolts.

The driving-shaft B is located adjacent to the bottom plate, near the front of the frame, and is provided with a balance-wheel and fast and loose pulleys, to be belted to and driven by some convenient shaft. Said shaft also serves as a crank-shaft, its two cranks, $a$, being connected by double-rod pitmen $a'$ to vertically-reciprocating slide-rods $a^2$, to which, near their upper ends, is rigidly secured an annular finger-plate, C.

The brim-stretching fingers D, usually twelve in number, are pivoted to the under side of the finger-plate C, and their fulcra are on links $b$ suspended from a fulcrum-plate, E.

Figure 7:
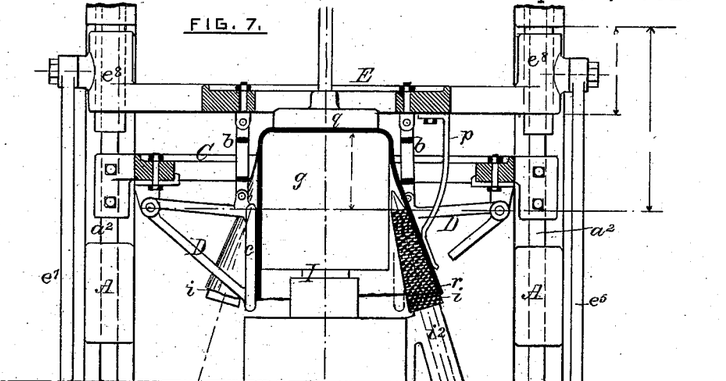
Fig. 7, Sheet 5, is a similar view of said devices as in position at the close of the stretching operation.
Figure 8:
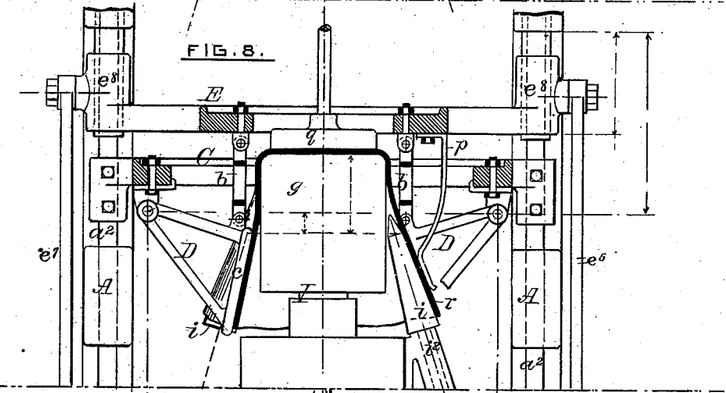
Fig. 8, Sheet 5, is an enlarged sectional view of the stretching devices in the positions respectively occupied by them as at the beginning of the stretching operation.

As thus far described, it will be seen that with the rotation of the main shaft the working-faces $c$ of the fingers will be angularly reciprocated or vibrated toward and from a common center, substantially as in my aforesaid Letters Patent No. 175,953. Instead, however, of said fingers being maintained in one position during their vibration, as heretofore, their working-faces $c$ are gradually changed from an angular position, as seen in Fig. 8, to the vertical position shown in Fig. 7, and back again, and this variation is accomplished by moving the fulcrum-plate E up and down. This feature of providing the series of stretching-fingers with variable fulcra is of value, even if the fulcrum-plate be moved up and down by a hand-lever readily applied thereto, and it is of course of proportionally greater value if said movements are automatic, as in this machine, as hereinafter described.

The driving-shaft B at one end has a small cone-pulley, $d$, which is belted to a larger cone-pulley, $d'$, loosely mounted upon a two-part cam shaft, F F', which is intermittingly rotated by means of a friction-clutch controlled by a stop-motion, as hereinafter more fully described. Of the fulcrum-plate it is now only necessary to state that the shaft F' has a cam, G, Fig. 1, which vibrates a lever, $e$, on a rock-shaft, $e^9$. This lever $e$ is constructed in two parts, and to the upper end thereof a link, $e'$, is pivoted at one of its ends, which is provided with a handle at its opposite or front end, and with a clamping-screw, $e^2$, which occupies a slot, $e^3$, in the upper or long arm of a bell-crank lever, $e^4$, the short arm of which is connected with the fulcrum-plate E by a long vertical rod, $e^5$. The axis of the bell-crank lever $e^4$ is a bow-shaped rock-shaft, H, (hereinafter described in another connection,) on the opposite end of which is a lever or arm, $e^6$, connected by a long rod, $e^7$, with the opposite side of the fulcrum-plate E, as clearly seen in Fig 3.

The fulcrum-plate is provided with tubular slide-bearings $e^8$, surrounding sleeves depending from the top plate, A³, and within which are the adjacent slide-rods $a^2$, by which the fingers are reciprocated. It will be readily seen that with each rotation of the cam G the fulcrum-plate will be raised and lowered, and that by adjusting the hand-link $e'$ in the slot $e^3$ of the lever $e^4$ the degree of lift may be varied, and thus vary the stretching effect according to the general character of the hat bodies with reference to their strength.

It is to be understood that the variation in the working position of the faces $c$ of the stretching-fingers D is necessitated when such fingers are employed in connection with lower co-operating stretching devices, which are incapable of expansive arrangement, and those now used by me are in that respect unlike those shown in my aforesaid prior Letters Patent, wherein the lower stretching devices are variable in position and the upper devices or reciprocating fingers non-variable—i. e., their working-faces vibrate always in the same position.

The means suitable for moving the fulcrum-plate, as is shown, may be exceedingly simple; but it is obvious that the same results may be obtained if the fulcrum-plate be stationary and the finger-plate be varied in its position on the slide-rods $a^2$, while reciprocating therewith. It will be therefore understood that I do not limit myself to movable or variable fulcra or a movable fulcrum-plate, except as hereinafter indicated, because it is immaterial, so far as relates to the stretching operation, whether the fulcrum-plate be movable or stationary, so long as either said plate or the finger-plate be movable with reference to each other during the operation of the stretching-fingers.

The former I used in this machine is similar in some respects to that shown in my aforesaid prior Letters Patent, but it differs therefrom in certain important particulars. As described in said prior patent this former is mounted upon a spindle, $f$, but instead of being lifted to the vibrating stretching-fingers, as heretofore, by means of a treadle, it is lifted automatically, and in that respect alone considered it is like the machine shown in my prior Letters Patent No. 91,730, June 22, 1869, wherein the stretching-fingers shown are not vibrated, but therein the former is not of the character shown in my Letters Patent No. 175,953, nor is it controlled by a stop-motion, as in my present machine. This former I has a supporting-shell, $g$, similar to a hat-block, although it performs no blocking function, and in respect of its form and function it is like that shown in said prior Letters Patent No. 175,953, and it is also, like that one, capable of vertical adjustment on its spindle $f$, so as to provide for properly supporting hats with varied height of crown by means of the central vertical adjusting screw, $g'$, above the top of the spindle $f$, and serving practically as a prolongation thereof, but unlike said prior shell this is capable of free rotation to facilitate the automatic rotation of the hat-body during the stretching operation. This rotation of the shell without a corresponding rotation of the screw $g'$ is effected as follows:

The entire former is supported upon a sleeved cross-head, $h$, secured to the spindle $f$. A disk, $g^2$, within the former has a tapped hub or neck, which loosely occupies the sleeve $h'$ of the cross-head, and is occupied by the screw $g'$, and while said disk $g^2$ is rotative with the shell $g$, it rests upon the top of the sleeve of the cross-head, so that by turning the screw $g'$ the shell may be raised or lowered with relation to the disk $g^2$, the spindle, and the cross-head, and be capable of rotation with the screw and disk upon the top of the cross-head sleeve. This former has a series of ribs, $i$, which are equal in number to the stretching-fingers, and alternate therewith in working position. These former-ribs are in function unlike any heretofore known to me, in that they are not only stretching devices co-operating with fingers, as in my prior patent, but they are also the media by which the hat-body is rotated automatically during the stretching operation. Said ribs are conical in form, have serrated or barbed surfaces for well engaging with a hat-body, but without injury thereto, are located around the shell $g$, radiate downward and outward or angularly therefrom, and each is mounted on a spindle, $i'$, having its bearings midway, and also at its lower end, in a metallic frame, $i^2$, non-rotatively mounted upon the sleeve $h'$ of the cross-head $h$, and it is therefore mounted on the former-spindle $f$, so that it cannot rotate thereon. Each of the rib-spindles $i'$ has near its lower end a pinion, $i^3$, and all of said pinions mesh with a bevel-gear, $i^4$, which has a hub below the shell, journaled upon the sleeve $h'$ of the cross-head $h$, so that when said beveled gear is rotated all of the ribs are also rotated in one direction. The large gear $i^4$ has two sets of teeth, the upper set beveled and the lower set straight, as is clearly shown in Figs. 1, 2, and 3.

I will first describe how the former is lifted to and lowered from the stretching-fingers, and then describe how the stretching-ribs of the former are rotated.

Figure 2:
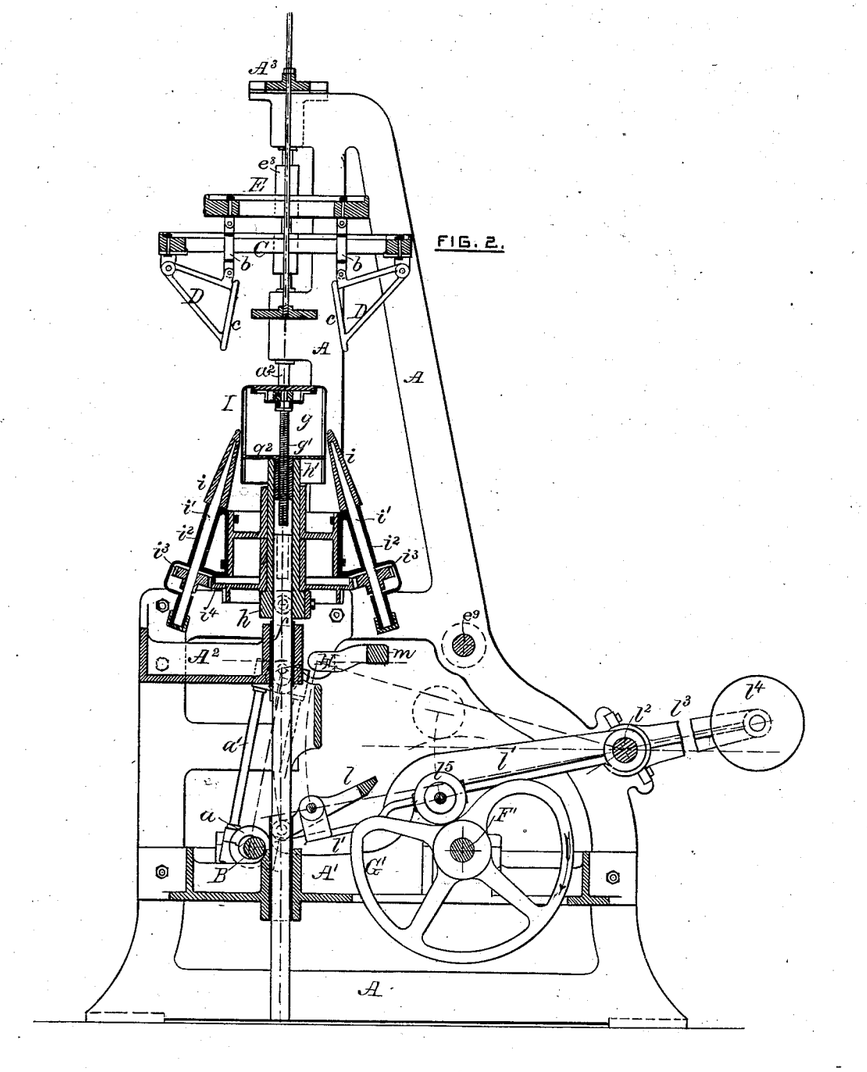
Fig. 2, Sheet 2, is a vertical central section of the machine with a portion of the brim-stretching fingers removed and with such as remain out of working relation with the former, which constitutes a stretching device, co-operating with the fingers.
Figure 3:
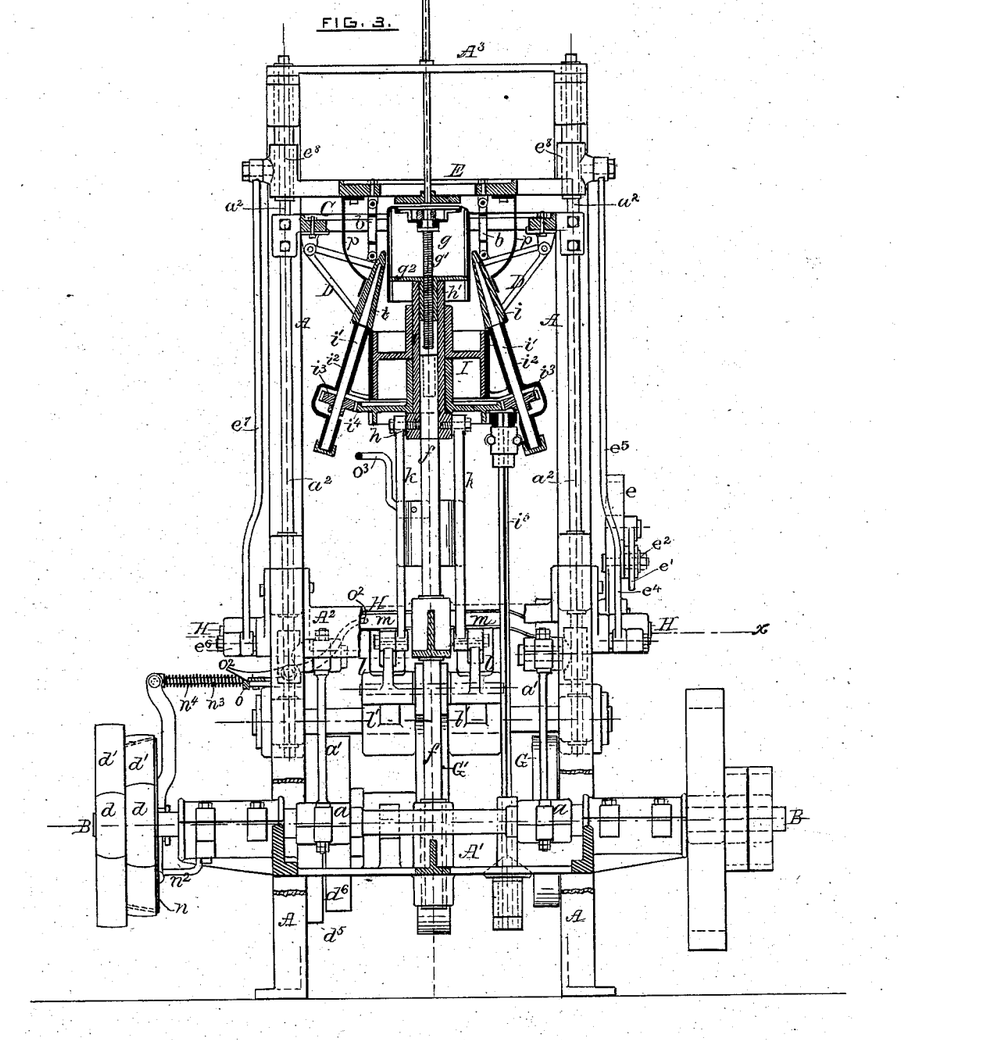
Fig. 3, Sheet 3, is in part a vertical central section and partially a front elevation with the stretching devices in working position as shown in Fig. 1.
Figures 4, 5, 6:
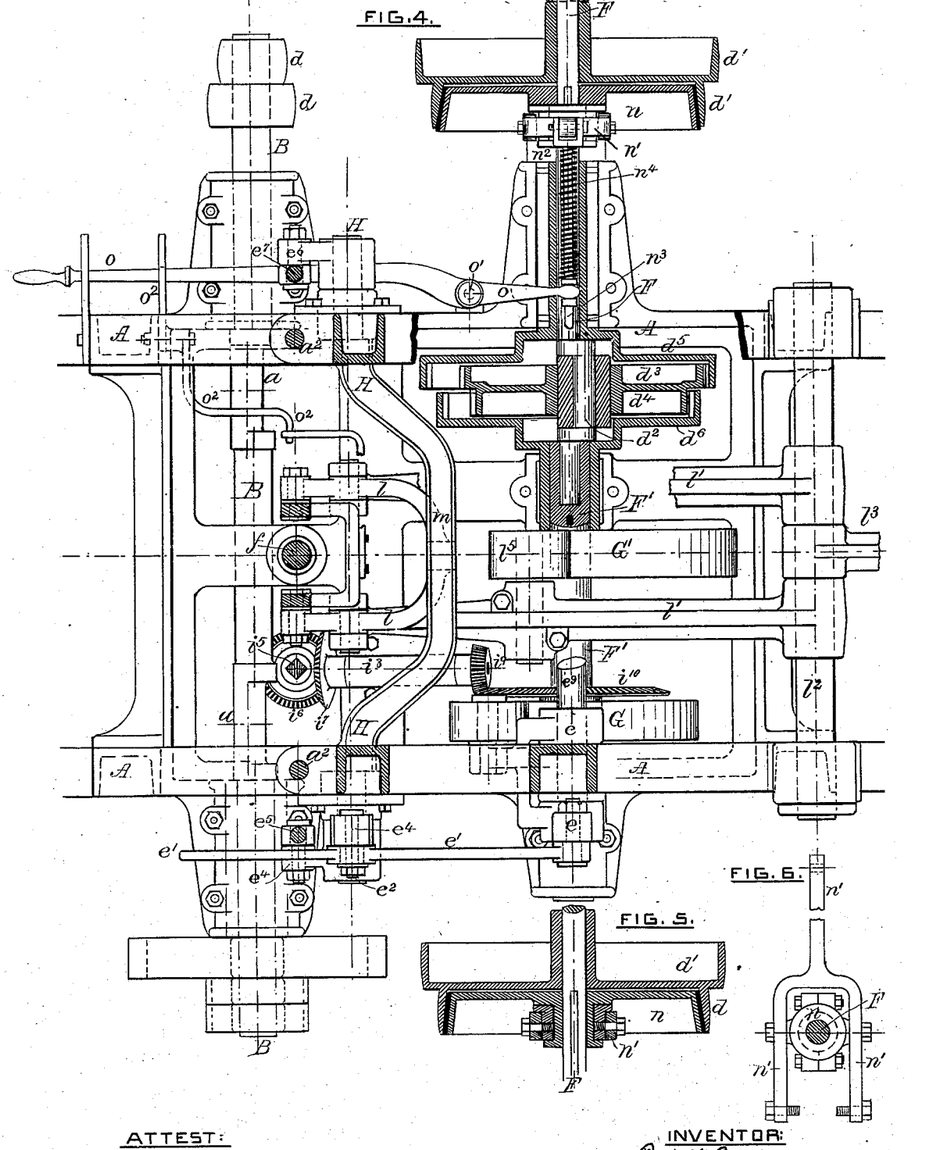

The cross-head $h$ is of course rigidly secured to the former-spindle $f$, and is supported upon a pair of vertical rods, $k$, which in turn are supported upon a supplemental bow-shaped lever, $l$, Figs. 2, 3, and 4, which is pivotally mounted upon a two-armed lever, $l'$, having its fulcra on a rock-shaft, $l^2$, to which, between said levers, is keyed an arm, $l^3$, having at its outer end a balance-weight, $l^4$. Between said levers $l'$, and secured thereto, is a friction-wheel, $l^5$, which bears upon a former-cam, G', on the cam-shaft F', before described, said cam being shaped as shown, so as to lift the former and lower it during one rotation with the proper intervening dwell to provide for ample time in which the stretching devices may be operated.

Figure 1:
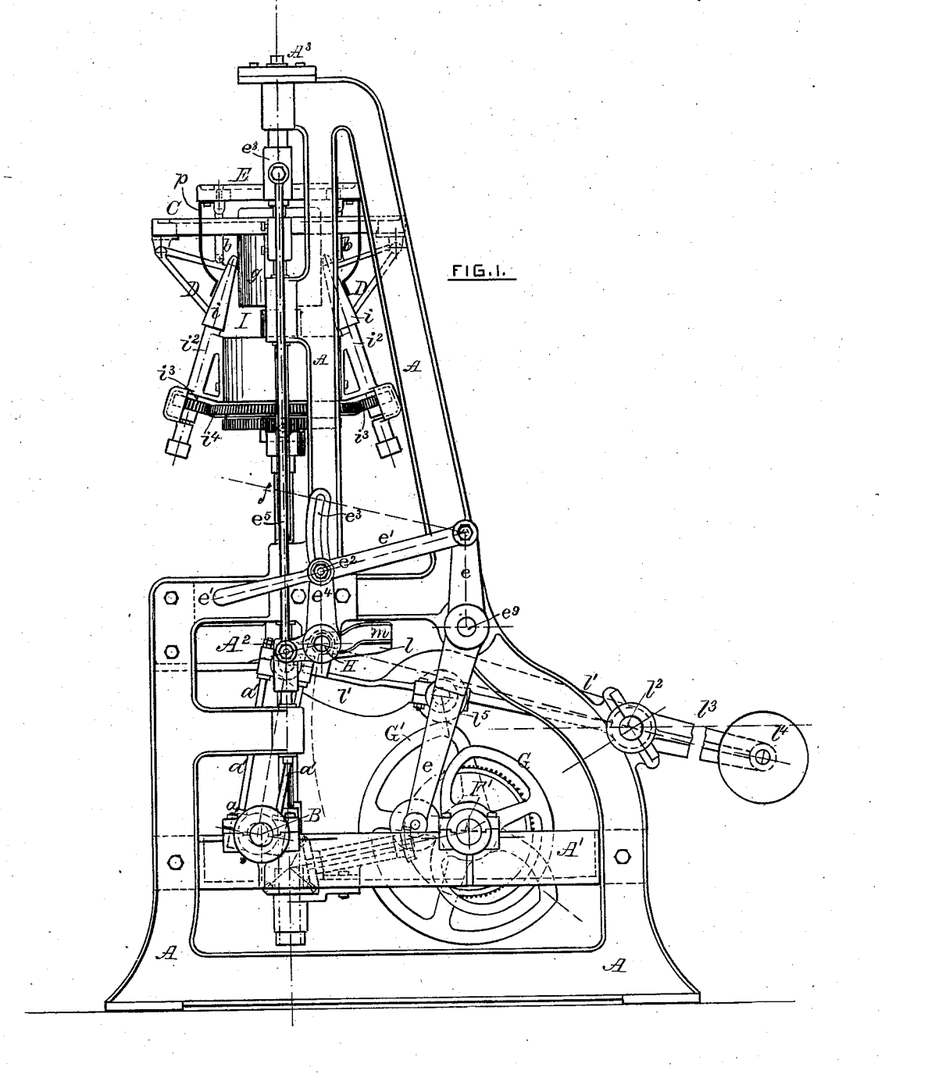

The function of the lifting and lowering cam is to merely place the former into working position with relation to the stretching-fingers, and to lower it therefrom; but after said fingers begin their work said former is further elevated, in order that its ribs may progressively co-operate with the fingers during the variation in position of their faces, due to the variable position of the fulcrum-plate, already described. This progressive upward movement of the former is made to correspond exactly with the movement of the fulcrum-plate, as follows: As the bow-shaped rock-shaft H is turned with its bow $m$ downward during the lifting of the fulcrum-plate, said shaft, its bow operating like a crank, and being in contact with the rear end of the bow-shaped lever $l$, forces that end downward, and thereby lifts said former while the fulcrum-plate is rising, as illustrated in Fig. 1, wherein the former has been lifted by its cam G', and is being lifted still farther by the fulcrum-plate cam G, acting through the lever $e$, link $e'$, bell-crank lever $e^4$, and the part $m$ of the bow-shaped portion of the rock-shaft H. The cam G therefore is not only a fulcrum-plate lifter, but also a lifter of the former in exact harmony with the movement of the fulcrum-plate, thus causing the ribs of the former to properly co-operate with the fingers during the variation in position of their working-faces.

It will now be clearly seen that the cam G' operates quickly in raising and lowering the former, but that after the cam G' has ceased to lift the cam G slowly lifts the former to its full height.

The rotation of the ribs $i$ through their bevel-gear $i^4$ is effected by the meshing with the straight teeth of gear $i^4$ of a pinion mounted upon the upper end of a square shaft, $i^5$, Fig. 3, secured to and moving vertically with the frame $i^2$ and spindle $f$, and sliding in the square eye of a bevel-gear, $i^6$, Fig. 4, which is rotatively mounted by means of a hub and collar, and driven by a bevel-gear, $i^7$, on one end of an inclined shaft, $i^8$, Figs. 1, 3, and 4, having at its opposite end a bevel-gear, $i^9$, which meshes with a larger bevel-gear, $i^{10}$, on the cam-shaft F', adjacent to the inner side of cam G.

Figures 9, 10, 11:
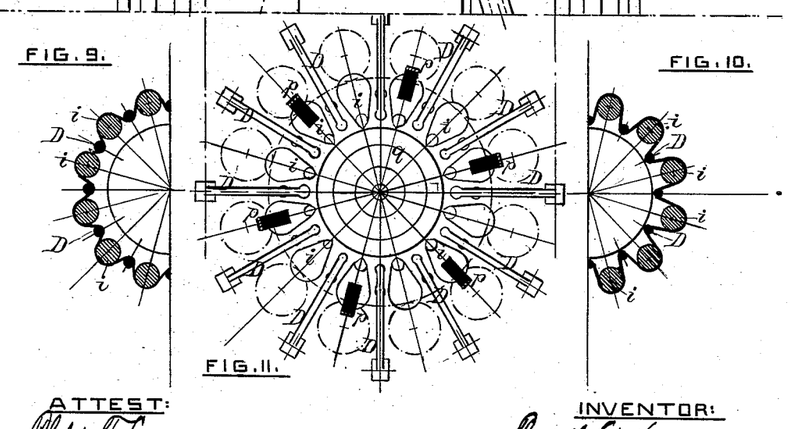
Figs. 9 and 10, Sheet 5, are horizontal sectional views of one-half of the stretching devices respectively in position as shown in Figs. 7 and 8.
Fig. 11, Sheet 5, is a top view of the stretching devices in working position.

Although it is preferable that the ribs be automatically rotated, as described, desirable results will accrue if the same be rotated by hand, as with a crank. In order that the hat-body may be continuously held in good engaging contact with the rotating ribs, I have combined therewith smooth-faced compressing-springs $p$, between which and said ribs the hat-body is compressed. These springs are preferably connected with the fulcrum-plate E and pendent therefrom, as shown, so that as the latter descends the springs also descend and serve to force the hat-body downward upon the ribs. These springs need not be employed with all the ribs, but with every other one, as clearly indicated in Fig. 11.

While it is obviously preferable that the springs be movable, as described, for better forcing the hat-body downward upon the ribs, the springs may with good results be mounted upon an annular plate fixed to the frame of the machine and located in a plane slightly below the stretching-fingers, so that each spring will be extended upward and inward and have downwardly-curved ends, in which case said springs would operate substantially as those shown if the fulcrum-plate were stationary.

The vibration of the fingers is continuous, but the rotation of the ribs $i$ is intermittent, they resting whenever the former rests at its lowest position, due to the action of the stop-motion, to be described. The movements of the fingers being very rapid, and the movements of the fulcrum-plate and the former being quite slow, necessitates a slow rotation of the part F' of the cam-shaft, and as this involves speed-reducing gearing, I prefer to employ differential gearing, which I will next describe. This cam-shaft is in two parts, with coincident axes, as seen in Fig. 4. The part F has at its outer end the cone-pulleys $d'$ and at its inner end a fixed crank, $d^2$, which at one end has a free axial bearing in the center of the part F' of the cam-shaft.

On the crank $d^2$ is a pair of coupled gears, $d^3$ $d^4$, which respectively engage or mesh with a fixed internal gear, $d^5$, and an internal gear, $d^6$, which is secured to the shaft F', so that as shaft F is rotated with its crank the gears $d^3$ $d^4$ are rotated, and by the engagement of gear $d^3$ with the fixed gear $d^5$, and of gear $d^4$ with gear $d^6$ the cam-shaft proper, F', is slowly rotated, as is common with differential gearing of the character described.

I will next describe the stop-motion herein illustrated, although in many respects it is similar to that employed in my prior automatic brim-stretching machine, hereinbefore referred to as constituting the subject of a prior application for Letters Patent. As in said organization, I now employ a friction clutch and a spring for securing good contact of the clutch-faces, and I also, as in said machine, control said clutch, so far as relates to disengaging it, by means of the former-spindle, which disconnects the cam-shaft from the rotating loose cone-pulleys $d'$ just as the former reaches its lowest position.

In Figs. 3, 4, 5, and 6, Sheets 3 and 4, it will be seen that the interior of the cone-pulley $d'$ is tapered, to afford a good seat for the friction-cone $n$, which is splined to shaft F and free to move longitudinally thereon. This cone at its hub is pivotally connected by means of the usual sleeve to a vertical forked lever, $n'$, having its fulcrum at its base upon a fixed arm, $n^2$, and at its upper end said lever $n'$ is pivoted to a rod, $n^3$, encompassed by an expansive spiral spring, $n^4$, which has a sliding abutment engaged by a shipper-lever, $o$, having a handle which projects at right angles to said rod and spring toward the front of the machine, and has its fulcrum at $o'$ on the side of the frame thereof. The action of the spring $n^4$, when compressed by moving the handle of the lever or shipper $o$ toward the frame of the machine, causes the rotation of the cam-shaft; but when the outer end of said shipper-lever is permitted to move in the opposite direction the clutch is disengaged.

Above and in close proximity to the lever $o$, near its outer end, is a crooked latch-lever, $o^2$, overweighted at its outer end, or provided with a spring which normally maintains its latch in the plane occupied by lever $o$, so that it will engage with and hold said lever, and thus maintain the spring $n^4$ under compression for maintaining an operative union of the friction-cone and pulleys. The inner end of the latch-lever $o^2$ extends toward and adjacent to the former-spindle $f$, so that when a projecting arm, $o^3$, which is secured to said spindle, (during and at the termination of its downward movement,) strikes the latch-lever at its inner end it elevates the outer end thereof, releases the shipper-lever, and disconnects the rock-shaft, whereupon the former and its spindle remain stationary until the handle of the shipper-lever is moved by hand toward the side of the machine, whereupon the spindle rises and the latch-lever re-engages with the shipper until it is again automatically released. The stop-motion mechanism is well shown in Figs. 3 and 4.

Referring to the brim-stretching fingers with respect to their capacity to vary the working position or angle of their faces, it is to be understood that a similar effect is produced by the expansion of the ribs, (shown in my Letters Patent No. 175,953,) and should obviously practicable mechanism be employed with such prior ribs for automatically expanding them during the stretching operation, and for automatically moving that former to and from the reciprocating or vibrating fingers it would constitute an embodiment of certain features of my present invention, although I prefer the organization herein described, because of the facility with which comparatively simple mechanism may be employed therewith for automatically rotating the hat, and also because it requires less complicated mechanism for varying the position of the working-faces of the stretching-fingers. This feature of the combination of upper and lower automatically-operated stretching devices with suitable means for automatically varying the positions of the surfaces in contact with the hat-body as the stretching operation progresses is capable of varied development, as will be readily suggested to persons skilled in the art, and I do not therefore limit this feature of my invention to brim-stretching fingers having variably-positioned working-faces.

In order that the hat-body may be readily freed from the engaging contact of the springs $p$ and the stretching-fingers, when the former descends after the stretching operation, I provide the suspended stripping-weight $q$, which is similar to that shown in my prior Letters Patent No. 175,953, but differs therefrom in that it is so mounted on a pendent spindle that it may rotate freely with the hat and the former.

The operation of a machine organized as shown would be substantially as follows: The main shaft of the machine would be in motion at the rate from two hundred and fifty to three hundred revolutions per minute, the brim-stretching fingers rapidly vibrating, the fulcrum-plate at its lowest position, and the former also at its lowest position and at rest, substantially as indicated in Fig. 2. A hat-body with a previously-stretched tip is placed upon the former, and then the hand shipping-lever o is moved by the operator toward the frame of the machine, whereupon the former commences to rise promptly and enables the latch-lever $o^2$ to engage with and to hold the shipper-lever in that position, the ribs of the former meantime rotating. After thus starting the machine the operator may leave it and place a hat-body on a similar machine, or on another of a series of machines, for progressively operating upon hat-bodies. When the former with the hat-body is placed in working relations with the stretching-fingers, the hat-body rotating all the while, it is then more slowly moved upward, while the fulcrum-plate descends, varying the position of the working-faces of the fingers from the angular position indicated in Figs. 7 and 9 to a practically-vertical position indicated in Figs. 8 and 10, wherein the hat-body $r$ is shown with its brim properly stretched. The springs $p$ during the stretching operation force the hat-body downward upon the ribs, and the rotation of the ribs serves to draw or pull the brim in circular or circumferential lines against the drag or friction of the fingers while in contact with the hat-body, and this stretching operation by the rotation of the ribs is an entirely new feature in hat-stretching machines. The ribs and fingers operate on the corrugation principle, the rotating ribs by a pulling stretch in circular lines, and the springs with the rotating ribs serve to stretch the hat-body in longitudinal lines parallel, or nearly so, with the axis of the hat-body, and therefore all of these devices co-operate to rapidly and effectually stretch the brims, and with a minimum of liability of injury to the hat-body. After the stretching operation has been fully accomplished the former is automatically lowered and the stop-motion operates, leaving the former in its lowest position, and at rest for the convenient removal of the stretched hat-body and the reception of another.

While I prefer for the best results that all of the several features of my invention be organized in one machine, it is obvious that separate portions thereof may be profitably employed otherwise than as hereinbefore specially indicated, and I do not therefore deem it necessary to point out how all of my said improvements may be separately organized with stretching-machines as heretofore constructed.

Having thus described my invention, I claim as new and desire to secure by Letters Patent—

1. The combination, substantially as hereinbefore described, of a series of automatically reciprocated or vibrating brim-stretching fingers and fulcrum and finger plates, either of which is movable toward the other while the fingers are in motion, for varying the position of the working-faces of the fingers, as set forth.

2. The series of automatically reciprocated or vibrating brim-stretching fingers provided with variable fulcra, substantially as described.

3. The series of automatically reciprocated or vibrating brim-stretching fingers provided with automatically-variable fulcra, substantially as described.

4. The combination, substantially as hereinbefore described, of the reciprocating or vibrating brim-stretching fingers, the movable fulcrum-plate, the cam, levers, and links for automatically varying the position of the fulcrum-plate while the fingers are in motion, as set forth.

5. The combination, substantially as hereinbefore described, of the reciprocating or vibrating brim-stretching fingers and the movable fulcrum-plate with the cam for moving said plate, and adjustable connections between said cam and plate for varying the position of said plate, and thereby varying the positions of the working-faces of the fingers, as set forth.

6. The combination, in a brim-stretching former, of ribs and a rotative supporting-shell, substantially as described.

7. The combination, with brim-stretching ribs, of a vertically-adjustable rotative shell, substantially as described.

8. In a brim-stretching former, axially-rotative ribs, substantially as described.

9. The combination, substantially as hereinbefore described, of the axially-rotating former-ribs and the mechanism by which said ribs are rotated.

10. The combination, with a series of rotating stretching-ribs and their rotating mechanism, of a stop-motion whereby the rotation of said ribs is controlled, substantially as described.

11. The combination, with the rotating ribs, of compressing-springs, substantially as described, for forcing the hat-body into good contact with said ribs.

12. The combination, with the rotating ribs, of the movable compressing-springs, substantially as described, whereby a hat-body is not only held in good contact with the ribs, but forced downward thereon.

13. In a brim-stretching machine, the combination, substantially as hereinbefore described, of reciprocating or vibrating stretching-fingers and ribs co-operating therewith as stretching devices, and mechanism for automatically varying the working positions of the surfaces of the stretching devices during the stretching operation, as set forth.

14. The combination, substantially as hereinbefore described, of automatically reciprocated or vibrated brim-stretching fingers and a former co-operating therewith, which is automatically placed into and out of working relations with the fingers, as set forth.

15. The combination, substantially as hereinbefore described, of the reciprocating or vibrating brim-stretching fingers and a former which is automatically lifted into working relations with said fingers, then gradually lifted during the stretching operation, and then lowered from said fingers, as set forth.

16. The combination, substantially as hereinbefore described, of the reciprocating or vibrating brim-stretching fingers, the former, said fingers and former being automatically placed into and out of working relations, and a stop-motion for maintaining them in a separated condition, as set forth.

17. The combination, substantially as hereinbefore described, of the reciprocating or vibrating brim-stretching fingers, the former automatically lifted to and lowered from said fingers, and a stop-motion, which causes said former to rest at its lowest position, as set forth.

18. The combination, substantially as hereinbefore described, of reciprocating or vibrating brim-stretching fingers, a former, and means for rotating a hat-body on the former during the stretching operation, substantially as described.

19. The combination, substantially as hereinbefore described, of the reciprocating or vibrating brim-stretching fingers and a former having rotating ribs.

20. The combination, with the stretching-fingers and a former having a shell free to rotate, of a rotative stripper-weight, substantially as described.

21. The combination, with the former, its spindle, and levers, of the two-part cam-shaft and the differential gearing, substantially as described.

R. EICKEMEYER.

Witnesses:
GEORGE NARR,
A. C. MOTT.